(12) United States Patent
Nagatsuma

(10) Patent No.: US 12,449,131 B2
(45) Date of Patent: Oct. 21, 2025

(54) FIRE PIT

(71) Applicant: TANAQRO. Co., Ltd., Saitama (JP)

(72) Inventor: Masato Nagatsuma, Tokyo (JP)

(73) Assignee: TANAQRO. CO., LTD., Saitama (JP)

( * ) Notice: Subject to any disclaimer, the term of this patent is extended or adjusted under 35 U.S.C. 154(b) by 495 days.

(21) Appl. No.: 17/850,104

(22) Filed: Jun. 27, 2022

(65) Prior Publication Data

US 2023/0111532 A1 Apr. 13, 2023

(30) Foreign Application Priority Data

Oct. 8, 2021 (JP) .................. 2021-166286

(51) Int. Cl.
*F24B 1/20* (2006.01)
*A47J 37/07* (2006.01)

(52) U.S. Cl.
CPC ........... *F24B 1/205* (2013.01); *A47J 37/0763* (2013.01); *F24B 1/207* (2013.01); *A47J 2037/0777* (2013.01)

(58) Field of Classification Search
CPC ... F24B 3/00; F24B 1/205; F24B 1/193; A47J 37/0763; A47J 2037/0777
USPC ....................... 126/25 R, 9 R, 9 B
See application file for complete search history.

(56) References Cited

U.S. PATENT DOCUMENTS

2007/0000393 A1\* 1/2007 Lam ............. A47J 37/0611
99/372

FOREIGN PATENT DOCUMENTS

| DE | 202004015650 U1 | * | 12/2004 | .......... A47J 37/0704 |
|----|----|----|----|----|
| JP | 2003-047564 A | | 2/2003 | |
| JP | 2014036835 A | * | 2/2014 | ............. A47J 37/07 |
| JP | 2017172893 A | | 9/2017 | |
| JP | 2021076334 A | * | 5/2021 | |
| JP | 6900077 B1 | * | 7/2021 | |
| JP | 2021-113628 A | | 8/2021 | |
| JP | 2021127864 A | * | 9/2021 | |
| KR | 20160026488 A | * | 3/2016 | .......... A47J 37/0763 |
| KR | 1020160026488 A | | 3/2016 | |
| KR | 20160103392 A | * | 9/2016 | ............... F24B 3/00 |
| KR | 1020160103392 A | | 9/2016 | |

OTHER PUBLICATIONS

Machine Translation of JP 6900077 (Year: 2021).\*
Machine Translation of KR 20160026488 (Year: 2016).\*
Machine Translation of KR 20160103392 (Year: 2016).\*
Machine Translation of JP 2014036835 (Year: 2014).\*
Machine Translation of JP 2021076334 (Year: 2021).\*
Machine Translation of JP 2021127864 (Year: 2021).\*
DE 202004015650 with Machine Translation (Year: 2004).\*
Office Action in related Chinese Patent Application No. 202211228687.5 dated May 27, 2025.

\* cited by examiner

*Primary Examiner* — Steven B McAllister
*Assistant Examiner* — Amy E Carter
(74) *Attorney, Agent, or Firm* — The Webb Law Firm

(57) ABSTRACT

A fire pit includes a fire bed and a pair of side panels set up facing each other to support the fire bed. The fire bed has a first bottom plate and a second bottom plate which are connected by a hinged connection and forms a valley with the hinged connection as the bottom. The pair of side panels, a first side panel and a second side panel, are attachable to and detachable from the fire bed, and form a curve in a convex shape towards the inward of the fire pit when attached to said fire bed.

3 Claims, 5 Drawing Sheets

[Figure 1]
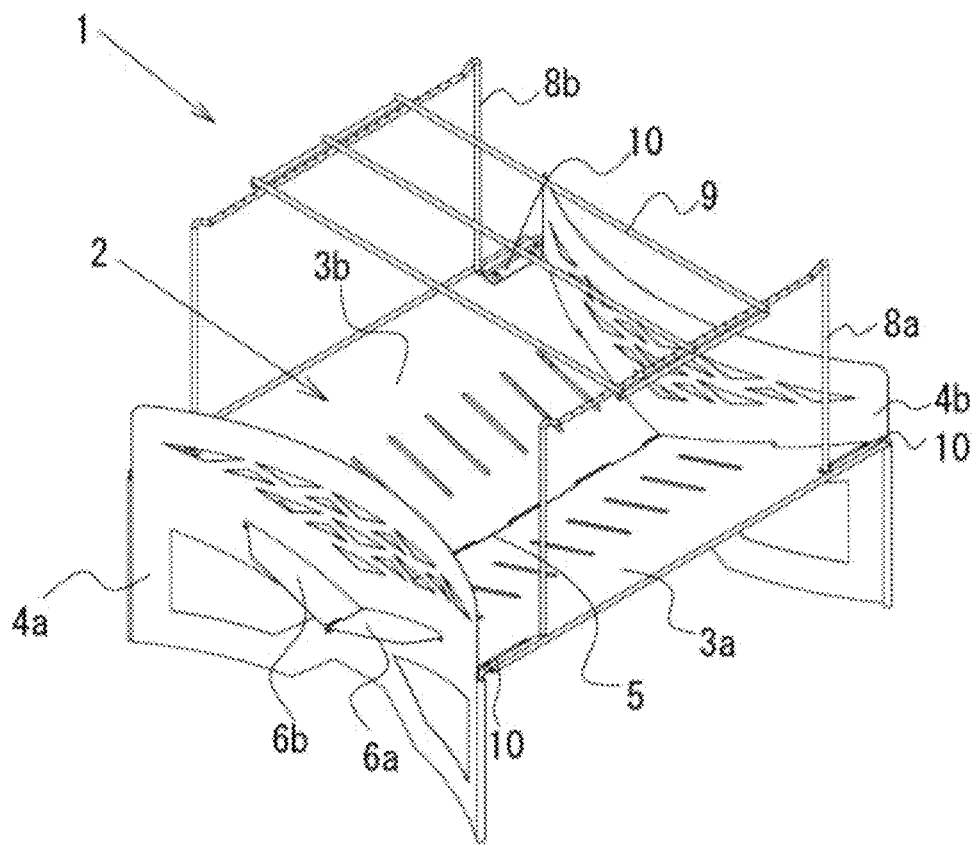
[Figure 2]
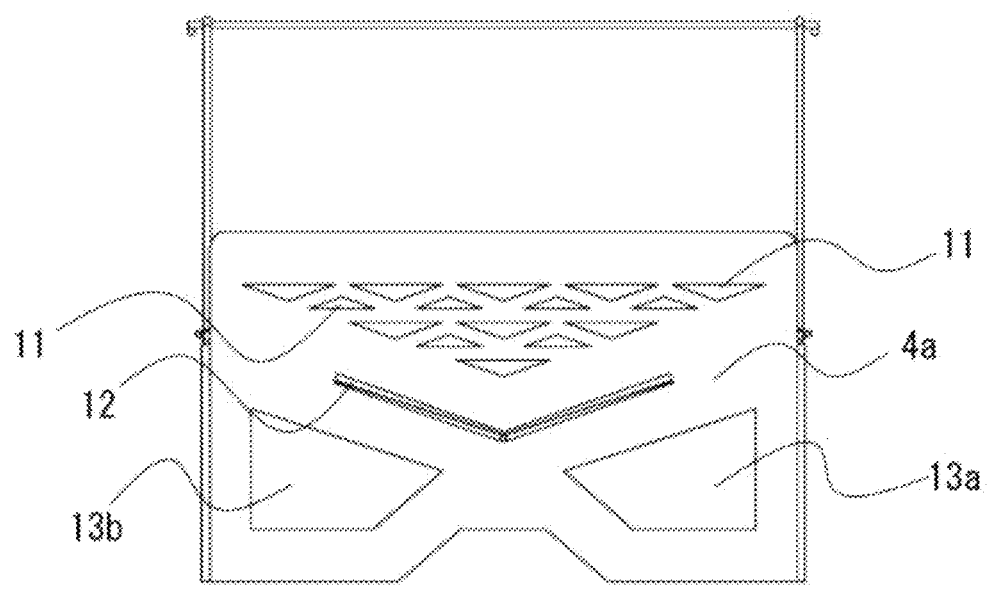

[Figure 3]
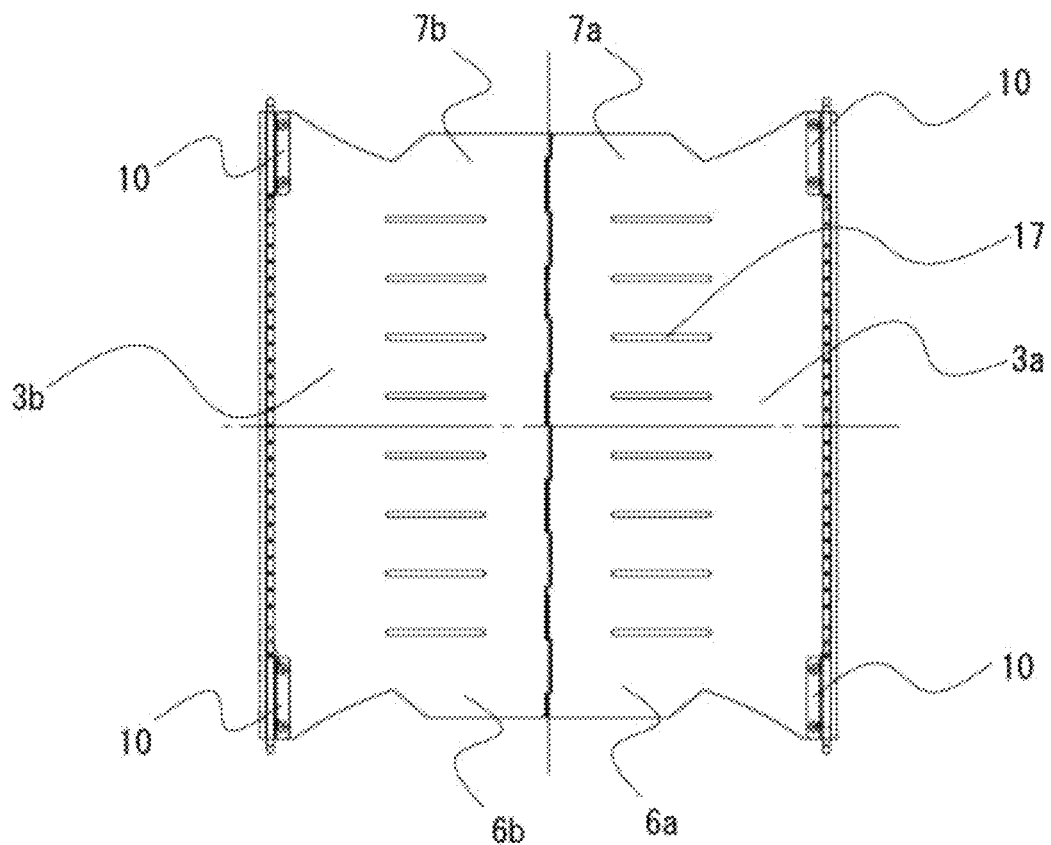
[Figure 4(a)]
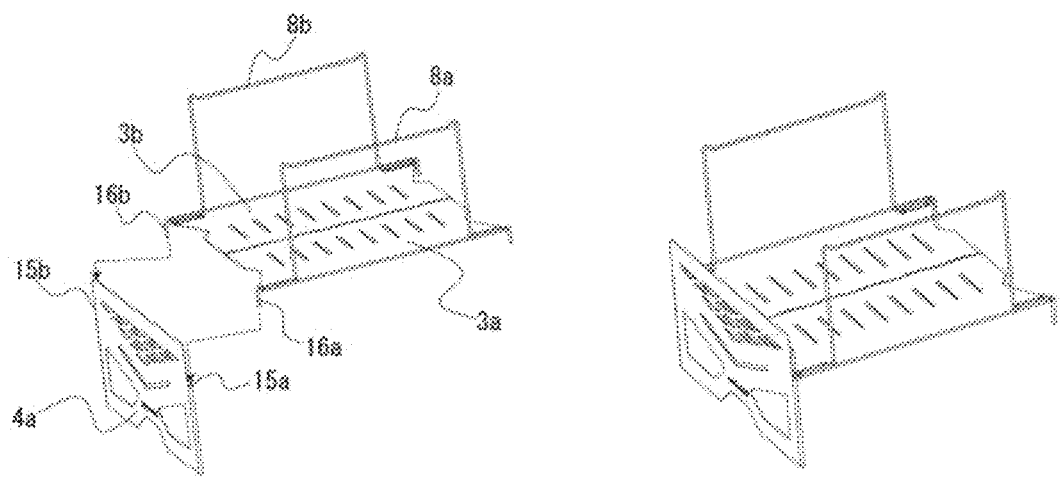

[Figure 4(b)]
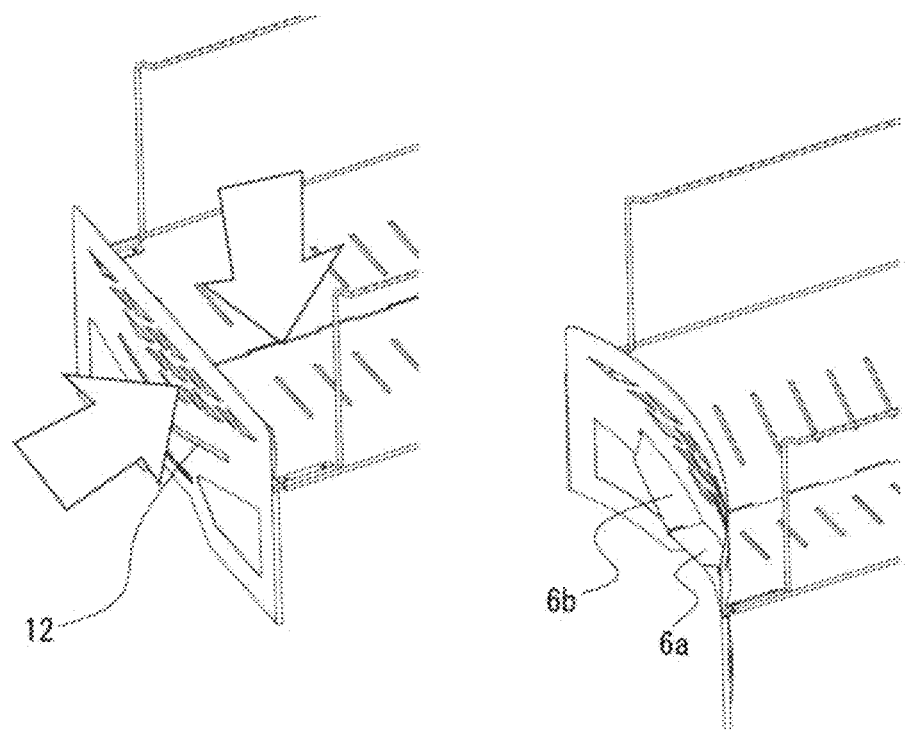
[Figure 4(c)]
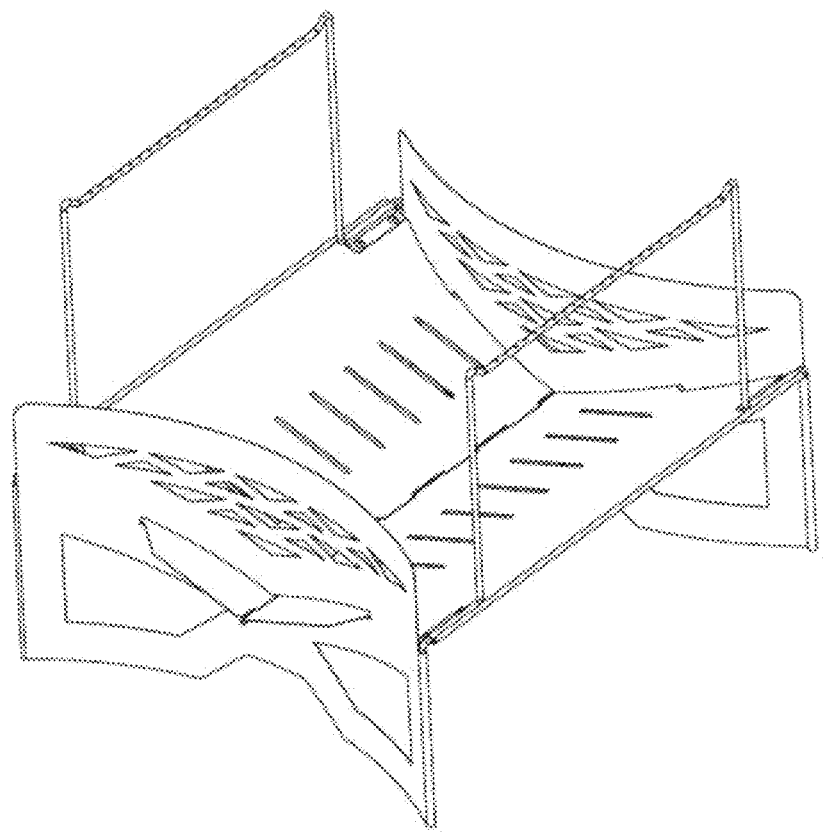

[Figure 5]
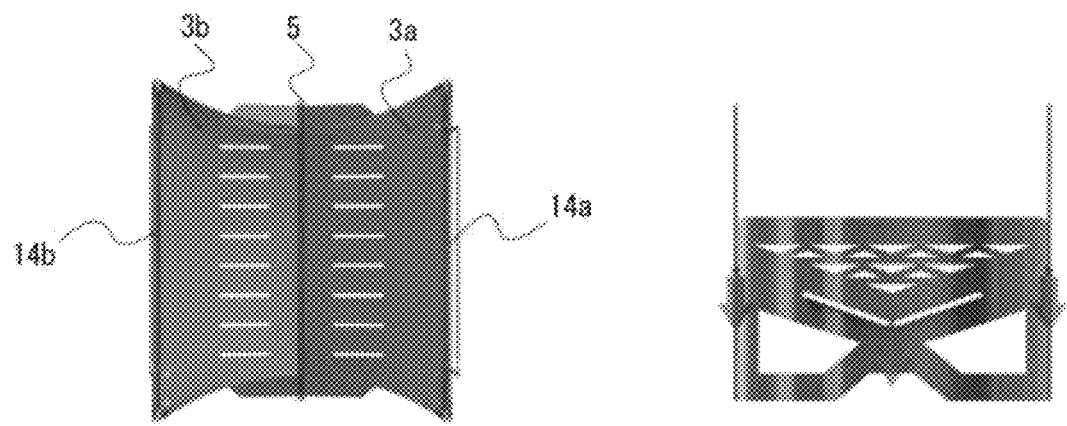
[Figure 6]
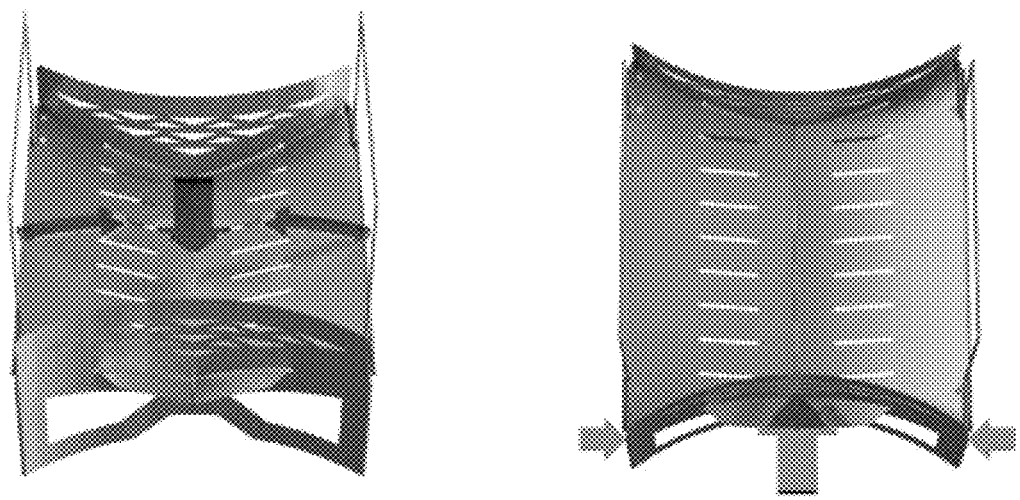

[Figure 7]
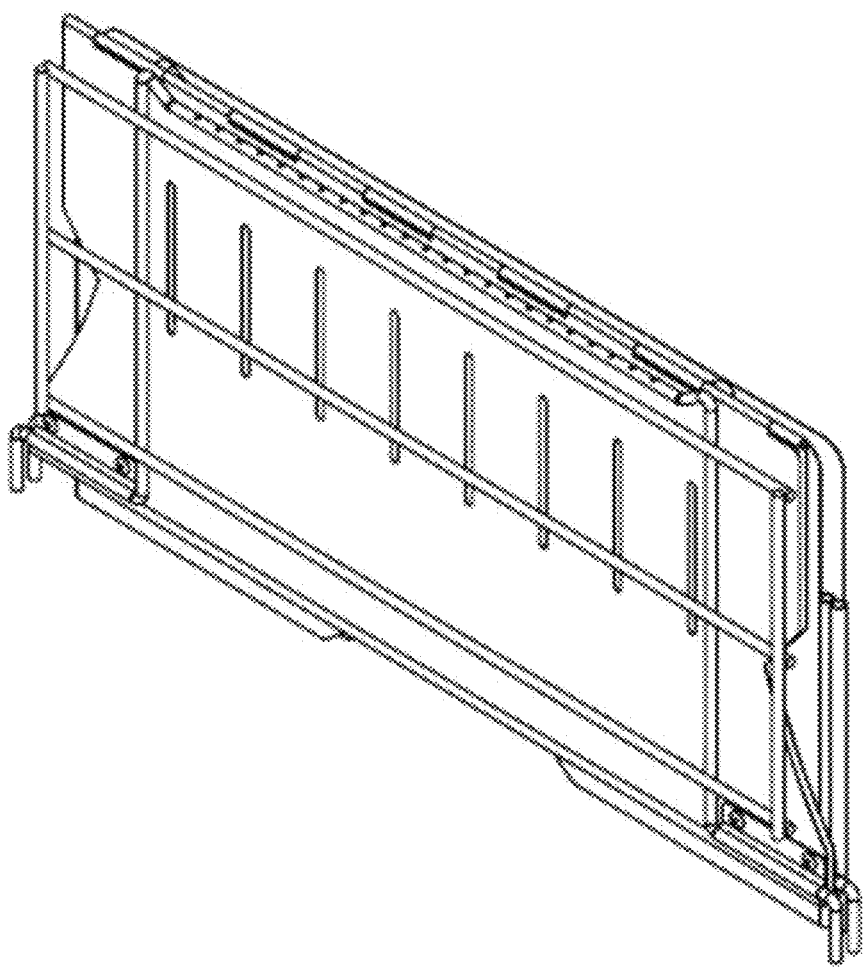

FIRE PIT

CROSS REFERENCE TO RELATED APPLICATION

The application claims priority to Japanese Patent Application No. 2021-166286, filed Oct. 8, 2021, the disclosure of which is hereby incorporated by reference in its entirety.

BACKGROUND OF THE INVENTION

Field of the Invention

The present invention relates to a portable fire pit for outdoor use.

Description of the Related Art

People often carry out outdoor activities like camping in a large group such as family and friends. One enjoyment in camping is to arrange many big firewood and to gather around the fire in a large group. However, in recent years, people who enjoy "solo camping", which is to go camping alone, are increasing. Light baggage is preferred when going camping alone. For example, it is preferable that a portable fire pit used for cooking and taking warmth is compact and can be packed in a backpack.

Therefore, a fire pit which is compact when carrying, but with a greatest possible fire bed when used and provides enjoyment of arranging many firewood is required. When the fire bed is big, not only a single person, but many people can gather around.

Moreover, it is required that the portable fire pit can be easily assembled.

Conventionally, when attempted to make a light and compact portable fire pit, the fire bed got small and the arrangement of firewood was restricted. For example, only three to four standard sized firewood could be used in such portable fire pits.

Moreover, assembly was troublesome since there were many components forming the fire pit, and it also had a problem of the components coming apart when lifted.

SUMMARY OF THE INVENTION

Accordingly, a portable fire pit which, when in use, its fire bed becomes a large shape and fire can be enjoyed by arranging firewood as you like, but becomes compact when folded and can be carried easily such as in a backpack, further, is light and easy to assemble, does not come apart when lifted after assembling, and has strength which can sufficiently withstand load from above is required.

The present invention has been proposed in view of such circumstances.

Namely, the present invention proposes a portable fire pit which, when not in use, its storability is excellent while when in use, its fire bed becomes a large shape and firewood can be arranged as you like, is light and easy to assemble, does not come apart when lifted after assembling, has strength which can sufficiently withstand load from above, and its connection between each component gets tighter when used.

The present invention provides a fire pit with a fire bed and a pair of side panels set up facing each other to support said fire bed, wherein said fire bed has a first bottom plate and a second bottom plate which are connected by a hinged connection and forms a valley with said hinged connection as the bottom, and said pair of side panels, a first side panel and a second side panel, are attachable to and detachable from said fire bed and form a curve in a convex shape towards the inward of the fire pit when attached to said fire bed.

Said first bottom plate and said second bottom plate respectively have a convex portion on the two sides perpendicular to said hinged connection, said first side panel and said second side panel respectively have a substantially V-shaped slit, and said convex portions are mated to said slits to be assembled.

The present invention relates to a sturdy portable fire pit, wherein the fire pit is formed by few components, and its connection between each component gets tighter when used due to a curvable side panel.

Since the first bottom plate and the second bottom plate are connected by a hinged connection, the fire bed can be folded when stored. When in use, the shape of the fire bed is close to a regular square, but when folded in half, the shape becomes rectangular and gets compact.

The side panels are attachable to and detachable from the fire bed, and form a curve in a convex shape towards the inward of the fire pit when attached to the fire bed. The side panels have a substantially V-shaped slit and the bottom plates of the fire bed have convex portions. Since the side panels and the bottom plates are connected by convex portions mating the slit, they stay connected when the assembled fire pit is lifted. The more load put to the bottom of the fire bed, the more the connection between the side panels and the fire bed gets tighter. While accomplishing light-weighting by applying thin plates and a compact storing size by division, it also accomplishes a tough structure without the feel of weakness in structure due to division.

Moreover, the fire bed forms a valley with the hinged connection as the bottom. This is because, compared with a flat fire bed, a valley-shaped fire bed more easily accumulates ash and charcoal at the valley portion, better prevents ash from flying and enables easier ash disposal.

BRIEF DESCRIPTION OF DRAWINGS

FIG. 1 A perspective view showing the fire pit of the present invention.

FIG. 2 A front view of the present fire pit.

FIG. 3 A plan view of the present fire bed.

FIG. 4(a) The first assembly procedure of the fire pit of the present invention.

FIG. 4(b) The second assembly procedure of the fire pit of the present invention.

FIG. 4(c) The final assembly procedure of the fire pit of the present invention.

FIG. 5 An explanatory drawing of the structure of the assembled fire pit.

FIG. 6 An explanatory drawing when load is applied to the fire bed.

FIG. 7 The fire pit when stored.

EXPLANATION OF REFERENCES 1 fire pit
2 fire bed
3a first bottom plate
3b second bottom plate
4a first side panel
4b second side panel
5 hinged connection
6a convex portion of the first bottom plate 6b convex portion of the second bottom plate
7a convex portion of the first bottom plate
7b convex portion of the second bottom plate
8a support part of the first bottom plate
8b support part of the second bottom plate
9 fire pit grate
10 metal part
11 air vent hole
12 slit of the side panel
13a punched portion of the first side panel
13b punched portion of the first side panel
14a outside side of the first bottom plate
14b outside side of the second bottom plate
15a cylinder part of the first side panel
15b cylinder part of the first side panel
16a end of the support part of the first bottom plate
16b end of the support part of the second bottom plate
17 air vent hole

DESCRIPTION OF THE INVENTION

Embodiments of the fire pit of the present invention will be described below using drawings.

FIG. 1 is a perspective view showing the fire pit of the present invention.

The fire pit 1 has a fire bed 2 and a pair of side panels, a first side panel 4a and a second side panel 4b set up facing each other to support said fire bed 2.

Said fire bed 2 has a first bottom plate 3a and a second bottom plate 3b which are connected by a hinged connection 5. Said fire bed 2 forms a valley with said hinged connection 5 as the bottom.

Said first side panel 4a and said second side panel 4b are attachable to and detachable from said fire bed 2, and form a curve in a convex shape towards the inward of the fire pit when attached to said fire bed 2.

A support part 8 is made with a metallic round rod which is fixed with a metal part 10 at both ends of the outside side of said first bottom plate 3a and said second bottom plate 3b. Said support part 8 has both the role of supporting a fire pit grate 9 and the role as a leg part.

The fire pit is used not only for burning fire for warmth, but also for cooking purpose, namely to light firewood in said fire bed 2, attach said fire pit grate 9, place an earthenware pot, iron pan, or iron plate, etc. filled with food (not shown) on said fire pit grate 9 and cook. Said fire pit grate 9 is movably attached.

FIG. 2 is a front view of the present fire pit.

The first side panel 4a has plural air vent holes 11, a substantially V-shaped slit 12, and punched portions 13a and 13b. The second side panel 4b also has the same structure.

Said air vent hole 11 is substantially triangular shaped or substantially inverted triangular shaped, and said plural air vent holes 11 as a whole form a substantially inverted triangular shape. The two sides of the substantially inverted triangular shape as a whole are parallel to the substantially V shape of said slit 12.

Said substantially V-shaped slit 12 is for connecting with said first bottom plate 3a and said second bottom plate 3b of said fire bed 2.

Said punched portions 13a and 13b are substantially square-shaped which are for light-weighting the structure, and are formed symmetrically about a vertical center line of said side panel.

Moreover, said first side panel 4a has a cylinder part 15a on the right end lower part and a cylinder part 15b on the left end lower part which are formed by bending said portion of the side panel inwards. These are for inserting the ends of said support part 8.

Said second side panel 4b also has the same structure as said first side panel 4a.

Said side panels are made of thin metal plates and are preferable that they bow moderately.

Said side panels prevent ash and sparks of the burning fire from flying and plays a role as a windshield preventing the fire from going out.

Regarding the material of the fire pit, stainless steel which is strong and has high heat retention is preferrable, but is not limited to it. Strength and thermal deformation characteristics nearly equal to that of material SUS304 (JIS) is sufficient, thus brass and, with the purpose of light-weighting, titanium and the like is also preferrable.

When the material is stainless steel, it is preferrable, but is not limited to, for the thickness to be around 0.3 mm. Moreover, the material is not limited to stainless steel if it bows.

FIG. 3 is a plan view of the fire bed.

The fire bed 2 has a first bottom plate 3a and a second bottom plate 3b which are connected by a hinged connection 5, and plural linear air vent holes 17. Said first bottom plate 3a and said second bottom plate 3b have the same shape.

Said air vent holes 17 are perpendicular to said hinged connection 5 and are parallel to each other.

Said first bottom plate 3a has a convex portion 6a and a convex portion 7a respectively on the two sides perpendicular to said hinged connection 5. Similarly, said second bottom plate 3b has a convex portion 6b and a convex portion 7b respectively on the two sides perpendicular to said hinged connection 5. Said convex portions are for mating said substantially V-shaped slits 12 of the side panels and are preferable to be arranged in a position closer to said hinged connection 5 on the two sides perpendicular to said hinged connection 5.

Said fire bed 2 can be folded in two with said hinged connection 5 as the center line when stored. When assembling, said fire bed 2 is first opened to 180 degrees, then adjusted to match the angle of said slit 12 of the side panels.

FIGS. 4(a), 4(b) and 4(c) show the assembly procedures of the fire pit of the present invention.

FIG. 4(a) shows the first assembly procedure.

The fire bed 2 folded in half when stored is opened so that the angle between the first bottom plate 3a and the second bottom plate 3b is 180 degrees.

Without curving the first side panel 4a, the end 16a of the support part 8a, which is fixed to said first bottom plate 3a of said fire bed 2, is inserted into the cylinder part 15a on the right end of said first side panel 4a.

Similarly, the end 16b of said support part 8b of said second bottom plate 3b is inserted into the cylinder part 15b on the left end of said first side panel 4a.

FIG. 4(b) shows the second assembly procedure.

Said fire bed 2 is pushed vertically downward at said hinged connection 5 as the center so as to make the angle between said bottom plate 3a and said bottom plate 3b smaller than 180 degrees, and simultaneously, said first side panel 4a is curved in the inward direction of said fire pit 2, and the convex portion 6a of said first bottom plate 3a and the convex portion 6b of said second bottom plate 3b are mated to the slit 12 of said first side panel 4a.

FIG. 4(c) shows the final assembly procedure.

Assembly is completed by attaching said second side panel 4b to said fire bed 2 similarly as described above.

Thus, the fire pit is a fire pit wherein (i) said fire bed is opened so that the angle between said first bottom plate and said second bottom plate is 180 degrees, then pushed vertically downward at said hinged connection as the center so as to make said angle smaller than 180 degrees, and simultaneously, (ii) said first side panel and said second side panel, respectively, are curved in the inward direction of said fire pit, and (iii) the convex portion of said first bottom plate and the convex portion of said second bottom plate are mated to the respective slit of said first side panel and said second side panel to be assembled.

Moreover, it is a fire pit wherein said first bottom plate and said second bottom plate respectively have a support part made with round rods for movably attaching a fire pit grate, and said support parts support the fire pit as a leg part by (i) respectively inserting both ends of said support part of said first bottom plate to the cylinder part on the right end of said first side panel when viewed from the outside of said first side panel and to the cylinder part on the left end of said second side panel when viewed from the outside of said second side panel and (ii) respectively inserting both ends of said support part of said second bottom plate to a cylinder part on the left end of said first side panel when viewed from the outside of said first side panel and to a cylinder part on the right end of said second side panel when viewed from the outside of said second side panel.

FIG. 5 is an explanatory drawing of the structure of the assembled fire pit.

There are three "beams" in the assembled fire bed 2. One is the hinged connection 5 in the center of the fire bed 2, and the other two are the outside side 14a of the first bottom plate 3a and the outside side 14b of the second bottom plate 3b.

Said three beams provide a strong structure to support vertical loading.

FIG. 6 is an explanatory drawing when load is applied to the fire bed.

For example, load from above is applied when firewood is put. When load from above is applied to the fire bed 2, force is applied from the outside of the first bottom plate 3a and the second bottom plate 3b towards the hinged connection 5, which is the center portion. This makes the side panels curve further inwards and the connection becomes tighter.

Therefore, when the present fire pit is actually used and firewood is put and load from above is applied, the outsides of said bottom panels move inward towards the hinged connection and said side panels curve further inwards.

Thus, the connection between each component becomes tighter when used, namely when firewood is put.

Moreover, since the fire pit is made to follow rough ground that it is put on and to follow changes such as those caused by panel distortion due to heat, the connection between components are tight and its durability is excellent.

FIG. 7 shows the fire pit when stored.

The fire bed 2 close to a regular square can be folded in half and stored compact in a rectangular shape. Since there are few components and has low thickness, it can be carried easily such as in a backpack.

The present invention provides a portable fire pit which, when in use, its fire bed becomes a large shape and fire can be enjoyed by arranging firewood as you like, but becomes compact when folded and can be carried easily such as in a backpack, further, light and easy to assemble, does not come apart when lifted after assembling, has strength which can sufficiently withstand load from above, and its connection between each component gets tighter when used.

The invention claimed is:

1. A fire pit comprising a fire bed and a pair of side panels set up facing each other to support said fire bed, wherein
    said fire bed comprises a first bottom plate and a second bottom plate which are connected by a hinged connection and forms a valley with said hinged connection as the bottom, and
    said pair of side panels, a first side panel and a second side panel, are attachable to and detachable from said fire bed, and made of metal plates that bow, and are each provided with a V-shaped slit, and form a curve in a convex shape towards the inward of the fire pit when tab portions provided on the first bottom plate and said second bottom plate are mated to said slits, and
    when load from above is applied to the fire pit, the side panels curve further inward, thereby tightening connections of the fire bed and the side panels.

2. The fire pit according to claim 1, wherein
    said tab portions are positioned on the two sides perpendicular to said hinged connection.

3. The fire pit according to claim 2, wherein
    said fire bed forms (i) a stored compact position comprising said first bottom plate and said second bottom plate folded together at the hinged connection as the center line, (ii) an open position comprising said first bottom plate and said second bottom plate extended away from each other with an angle between said first bottom plate and said second bottom plate of 180 degrees, and (iii) an assembled position adjusted from the open position comprising the hinged connection extending vertically downward as the center and said first bottom plate and said second bottom plate extended away from each other with an angle smaller than 180 degrees, and
    wherein, in the assembled position of (iii), said first side panel and said second side panel, respectively, are curved in the inward direction of said fire pit, and the tab portion of said first bottom plate and the tab portion of said second bottom plate of the fire bed are extend through the respective slit of said first side panel and said second side panel.

* * * * *